(12) United States Patent
Liu et al.

(10) Patent No.: US 9,700,816 B2
(45) Date of Patent: Jul. 11, 2017

(54) AXIAL TRANSFER LINE SHELL SIDE DEGASSING

(71) Applicant: IDEX Health & Science LLC, Rohnert Park, CA (US)

(72) Inventors: Quan Liu, Petaluma, CA (US); Yuri Gerner, Mendota Heights, MN (US); Carl Sims, Santa Rosa, CA (US)

(73) Assignee: IDEX Health & Science LLC, Rohnert Park, CA (US)

( * ) Notice: Subject to any disclaimer, the term of this patent is extended or adjusted under 35 U.S.C. 154(b) by 1 day.

(21) Appl. No.: 14/925,692

(22) Filed: Oct. 28, 2015

(65) Prior Publication Data

US 2016/0114264 A1    Apr. 28, 2016

Related U.S. Application Data

(60) Provisional application No. 62/069,426, filed on Oct. 28, 2014.

(51) Int. Cl.
*B01D 19/00*    (2006.01)
*B01D 69/04*    (2006.01)

(52) U.S. Cl.
CPC ....... *B01D 19/0031* (2013.01); *B01D 69/046* (2013.01)

(58) Field of Classification Search
CPC  B01D 19/0031; B01D 63/067; B01D 63/068; B01D 69/046; B01D 2325/06; B01D 2325/08
See application file for complete search history.

(56) References Cited

U.S. PATENT DOCUMENTS

| | | | |
|---|---|---|---|
| 3,668,837 A | 6/1972 | Gross | |
| 4,066,553 A * | 1/1978 | Bardonnet | B01D 63/065 210/321.87 |
| 4,325,715 A | 4/1982 | Bowman et al. | |
| 4,834,877 A | 5/1989 | Peters et al. | |
| 4,985,055 A | 1/1991 | Thorne et al. | |
| 5,340,384 A | 8/1994 | Sims | |
| 5,762,870 A * | 6/1998 | Vallana | B01D 63/06 210/247 |

(Continued)

FOREIGN PATENT DOCUMENTS

| | | |
|---|---|---|
| CA | 2268641 | 1/2001 |
| GB | 1536681 A | 12/1978 |
| RU | 2114688 C1 | 7/1998 |

OTHER PUBLICATIONS

Written Opinion issued in International Application Serial No. PCT/US2015/057854 dated Dec. 24, 2015 and mailed May 12, 2016.

*Primary Examiner* — Jason M Greene
(74) *Attorney, Agent, or Firm* — Haugen Law Firm PLLP (57) ABSTRACT

An elongated fluid degassing apparatus may be employed as a fluid transfer line for fluidly connecting components in a liquid system, while at the same time degassing, or preventing re-gassing of, the fluid. The fluid transfer line degassing apparatus forms a shell and tube degassing arrangement, wherein shell-side fluid flow is facilitated by one or more spacer elements that centrally position a semi-permeable separation membrane in the shell chamber. The degasser may include one or more tubular separation membranes that provide a gas-permeable, liquid-impermeable contact surface to effect the gas-liquid separation of the process fluid.

14 Claims, 11 Drawing Sheets

(56) References Cited

U.S. PATENT DOCUMENTS

| | | | |
|---|---|---|---|
| 5,876,604 A | 3/1999 | Nemser et al. | |
| 5,888,275 A * | 3/1999 | Hamasaki | B01D 19/0031 |
| | | | 95/46 |
| 5,989,318 A | 11/1999 | Schroll | |
| 6,248,157 B1 | 6/2001 | Sims et al. | |
| 6,309,444 B1 | 10/2001 | Sims et al. | |
| 6,805,730 B2 * | 10/2004 | Herczeg | B01D 63/02 |
| | | | 210/321.8 |
| 6,949,132 B2 | 9/2005 | Thielen et al. | |
| 7,144,443 B2 | 12/2006 | Gerner et al. | |
| 7,713,331 B2 | 5/2010 | Gerner et al. | |
| 2005/0120882 A1 | 6/2005 | Gerner et al. | |
| 2006/0037911 A1* | 2/2006 | Dasgupta | B01D 19/0031 |
| | | | 210/656 |
| 2006/0070525 A1* | 4/2006 | Johnson | B01D 19/0031 |
| | | | 96/6 |
| 2007/0095204 A1* | 5/2007 | Gerner | B01D 19/0031 |
| | | | 95/46 |
| 2011/0290726 A1* | 12/2011 | Liu | B01D 19/0031 |
| | | | 210/640 |
| 2013/0061748 A1 | 3/2013 | Sims et al. | |
| 2015/0265972 A1* | 9/2015 | Roesink | B01D 63/06 |
| | | | 210/323.2 |

\* cited by examiner

AXIAL TRANSFER LINE SHELL SIDE DEGASSING

CROSS-REFERENCE TO RELATED APPLICATIONS

This application claims priority to U.S. Provisional Patent Application Ser. No. 62/069,426, filed on Oct. 28, 2014 and entitled "Axial Transfer Line Shell Side Degassing", the content of which being incorporated herein in its entirety.

BACKGROUND OF THE INVENTION

The removal of entrained gasses from liquid is an important exercise in a variety of manufacturing and/or analytical processes. An example process in which liquid degassing is widely utilized is in liquid chromatography applications. The presence of dissolved gasses can be undesirable in such applications, wherein the presence of dissolved gasses may interfere with the functionality or accuracy of the application.

In the case of liquid chromatography, for example, it has long been known that the reduction of dissolved air from the chromatographic mobile phase is of critical importance to the stability of system flow rate and, accordingly, to the proper identification of compounds separated by the HPLC system. Dissolved gasses in the mobile phase can manifest in the form of bubbles, which can cause noise and drift in the chromatographic detector. Moreover, the existence of gas bubbles can cause erroneous absorption signatures at the detector.

The degassing of liquid materials has been necessary to the success of many processes, and consequently, various degassing systems and methods have been employed for some time. Techniques have included heating or boiling the fluid to be degassed, exposing the material to a reduced pressure environment or vacuum, and using combination of heat and vacuum to reduce the amount of dissolved gasses in the fluid. Vacuum degassing through a separation membrane has long been known, and generally utilizes a length of relatively small diameter, thin-walled, semi-permeable synthetic polymer barrier contained within an enclosed chamber held under a reduced pressure of vacuum. The fluid to be degassed is typically caused to flow through the lumen of the tubular membrane. Example such apparatus is shown in U.S. Pat. Nos. 5,340,384; 5,183,483; 4,430,098, and 3,668,837.

Other fluid degassing apparatus has been implemented for degassing fluids in fluid transfer lines that operably connect respective components of chromatographic instruments. In such systems, rather than routing the chromatographic fluids into a distinct vacuum chamber for a separate degassing stage, the fluid transfer lines themselves may be configured as tube-in-tube degassers. Example such apparatus is described in U.S. Pat. Nos. 7,713,331; 7,144,443; and 6,949,132, which are assigned to the present Assignee, and the contents of which herein incorporated by reference.

While such transfer line degassing systems have proven to be somewhat effective, certain limitations are inherent with conventional design. For example, the transfer line must oftentimes be flexed into a single or complex curved arrangement in order to appropriately fit between respective instruments in a chromatographic system. Such bending of the transfer line may result in the inner tubular separation membrane deflecting away from the central axis of the transfer line, and even into contact with the outer jacket. Such displacement of the tubular membrane can disrupt fluid flow patterns, thereby diminishing gas transfer efficiency. Moreover, conventional apparatus is typically arranged for "tube-side" degassing, in which the liquidous fluid is passed through the lumen of the tubular membrane, with the tubular membrane being disposed in an evacuated chamber. Degassing capability and efficiency in such an arrangement is limited, and is inferior to a "shell-side" degassing approach, wherein the liquidous fluid is passed through the chamber in surrounding relationship to the tubular separation membrane, with a reduced pressure or sweep gas environment presented in the lumen of the tubular separation membrane.

It is therefore an object of the present invention to provide radial support for substantially centrally positioning one or more tubular degassing membranes within an outer jacket. The radial support may prevent undesired deflection of the tubular separation membrane, and may also permit the use of thinner-walled tubular membranes that are structurally supported within the outer jacket. Reducing wall thickness of the tubular membrane can conserve significant cost to the overall apparatus.

SUMMARY OF THE INVENTION

By means of the present invention, liquidous fluid may be operably degassed in distinct transfer lines extending between respective components in an associated fluid flow system. The transfer lines of the present invention may be configured as axially-disposed individual degassing units having an elongated outer jacket and one or more tubular separation membranes disposed in a chamber defined by the outer jacket. The tubular separation membrane is preferably physically supported in a manner to maintain the membrane in a spaced relationship from an inner surface of the outer jacket, with a radial gap defined radially between the membrane and the inner surface of the jacket. By supporting the one or more tubular separation membranes in a spaced relationship form the inner surface of the outer jacket, efficient and replicative shell-side degassing is facilitated through consistent liquid flow space about the one or more separation tubes.

Support provided externally to the tubular separation membrane may further facilitate a reduced membrane wall thickness for reduced cost of materials and potentially increased degassing performance.

In one embodiment, an elongated fluid degassing apparatus of the present invention includes an outer flexible, liquid-impermeable jacket having an inner surface defining a jacket chamber along a central axis of the jacket, which has an inlet opening to the jacket chamber, and an outlet opening to the jacket chamber. The jacket has an aspect ratio of at least two. The elongated fluid degassing apparatus further includes a tubular membrane extending axially in the jacket chamber along a mutual axial length coextensive with the central axis. The tubular membrane has a first open end, with the membrane defining a luminal axis that is substantially parallel with the central axis. The tubular membrane forms a gas-permeable, liquid-impermeable barrier between the jacket chamber and the lumen. One or more spacer members are radially interposed between the membrane and the jacket in the jacket chamber substantially along an entirety of the mutual axial length to maintain the membrane in a space relationship from the inner surface of the jacket. A radial gap is defined radially between the membrane and the inner surface of the jacket.

In some embodiments, a first coupler unit is provided to fluidly connect a fluid inlet to the radial gap through the inlet opening of the jacket, as well as to fluidly connect the lumen to a gas flow path through the first open end of the tubular membrane. The apparatus may further include a second coupler unit that fluidly connects a fluid outlet to the radial gap through the outlet opening of the jacket.

A method for degassing a liquidous fluid includes providing the elongated fluid degassing apparatus described above, and evacuating the lumen through the first open end of the tubular membrane along the gas flow path. The method further includes motivating the liquidous fluid through the fluid inlet and into contact with the membrane in the jacket chamber, and thereafter delivering the liquidous fluid from the jacket chamber through the fluid outlet.

Another method for degassing a liquidous fluid includes providing the elongated fluid degassing apparatus described above, and passing a sweep gas through the lumen along the gas flow path. This method also includes motivating the liquidous fluid through the fluid inlet and into contact with the membrane in the jacket chamber, and thereafter delivering the liquidous fluid from the jacket chamber through the fluid outlet.

In another embodiment, a degassing system for degassing a liquidous fluid includes a liquidous fluid source, and a degassing apparatus that includes an outer jacket having an inner surface defining a jacket chamber along a central axis of the jacket, wherein the jacket has an inlet opening to the jacket chamber and an outlet opening to the jacket chamber. The degassing apparatus further includes a tubular membrane extending axially in the jacket chamber and having a first open end. The tubular membrane defines a luminal axis that is substantially parallel with the central axis. The tubular membrane forms a gas-permeable, liquid-impermeable barrier between the jacket chamber and the lumen. One or more spacer members are radially interposed between the membrane and the jacket in the jacket chamber to maintain the membrane in a spaced relationship from the inner surface of the jacket. A radial gap is defined radially between the membrane and the inner surface of the jacket. The degassing system further includes a transfer channel fluidically connecting the liquidous fluid source to the inlet opening of the jacket, and a pump for motivating the liquidous fluid from the liquidous fluid source through the jacket chamber of the outer jacket. A vacuum source evacuates the lumen through the first open end of the tubular membrane to create a driving force for degassing the liquidous fluid.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures, which are intended to be representative of various possible configurations of the invention. Other embodiments and aspects of the invention are recognized of being within the grasp of those having ordinary skill in the art.

A fluid degassing device as described herein includes an outer barrier that defines an interior chamber, wherein a substantially tubular separation membrane is positioned to separate the chamber into a permeate side and a retentate side. The retentate side of the chamber is configured for fluid-membrane contact along a fluid flow path between an inlet and an outlet of the apparatus. A degassing environment may be established at the permeate side of the chamber to develop a driving force for target gas to be transported through the membrane from the fluid. The degassing environment may be at reduced atmospheric pressure as a result of a pump evacuating the permeate side of the chamber through an evacuation port in the apparatus.

For the purposes hereof, the term "fluid" means any material capable of flow under force, including a liquid, a gas, and combinations thereof. The fluid is preferably guided along a fluid flow path through the degassing apparatus along channels, gaps, walls, and other structures that define at least partial boundaries to the fluid flow.

Figure 1A:
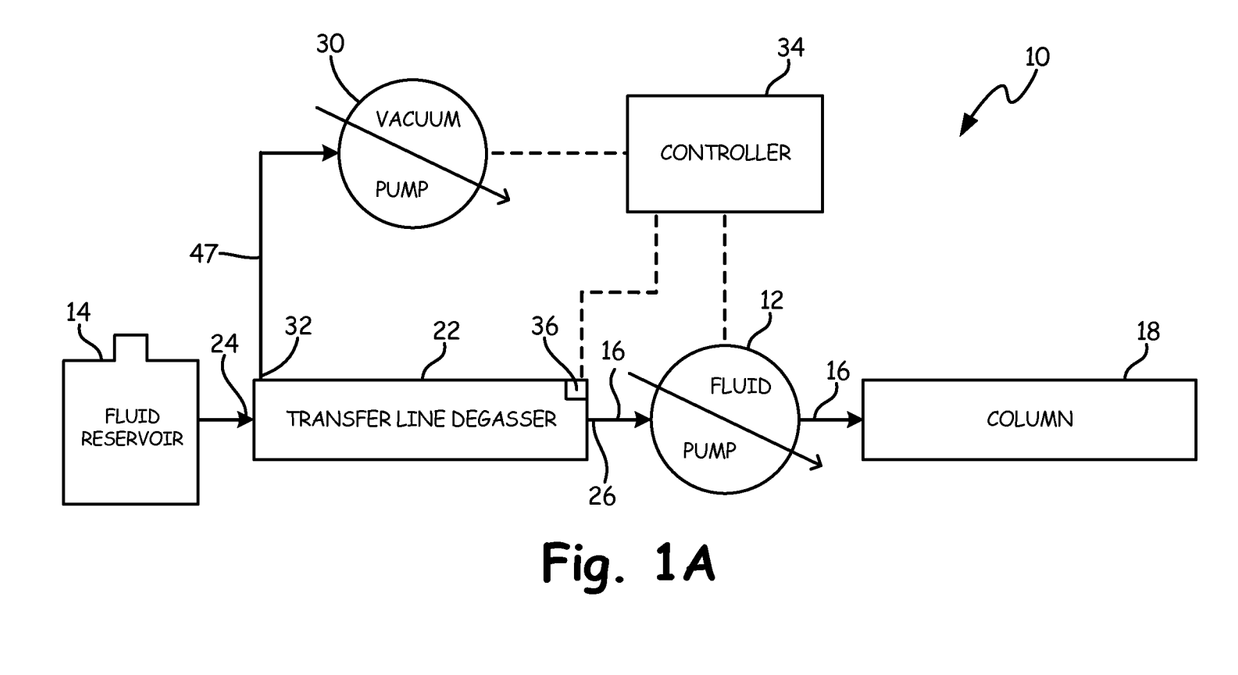
FIG. 1A is a schematic illustration of a degassing system of the present invention.
Figure 1B:
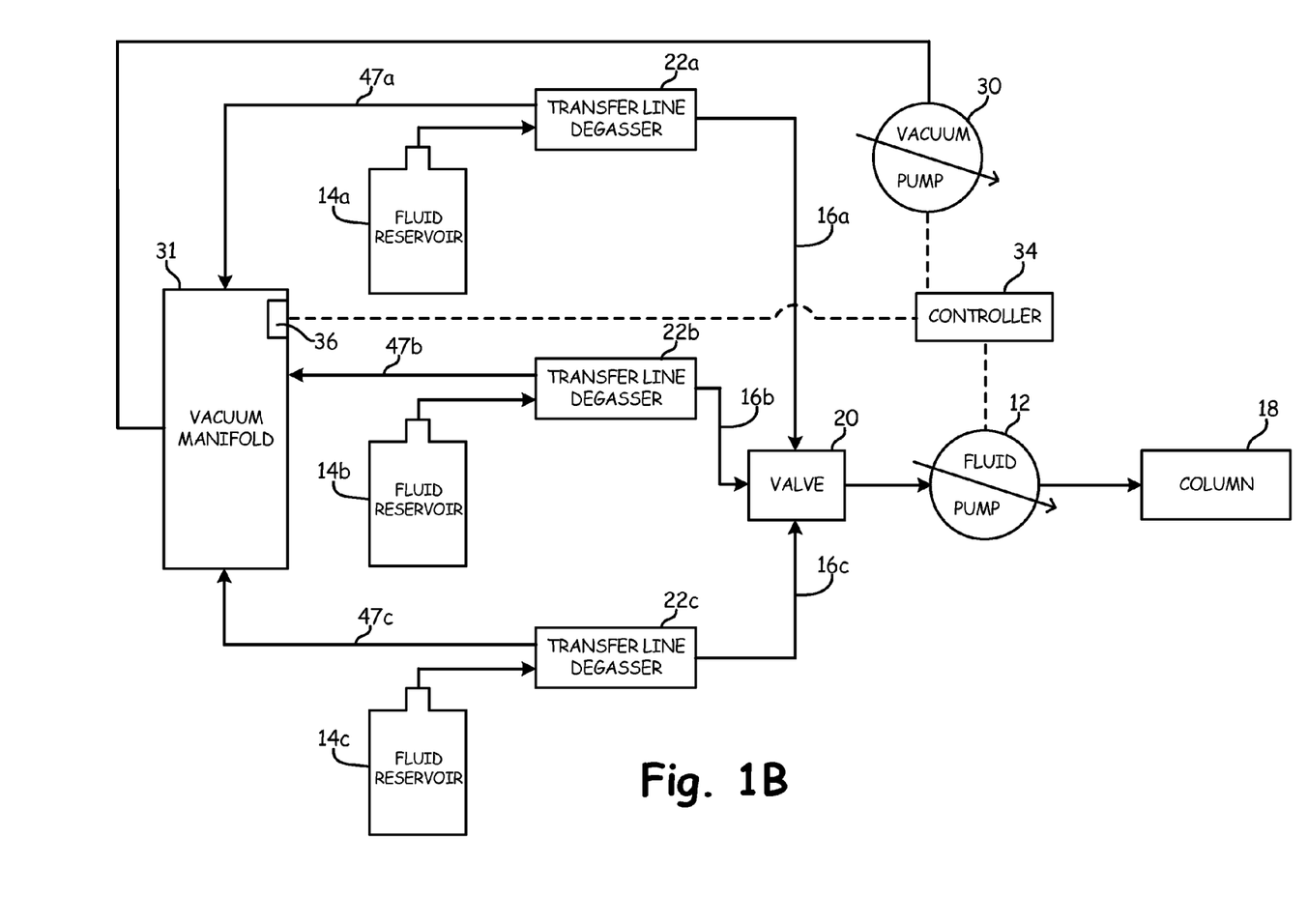
FIG. 1B is a schematic illustration of a degassing system of the present invention.

A schematic illustration of a fluid degassing system 10 is shown in FIGS. 1A and 1B, wherein system 10 includes a fluid pump 12 to motivate liquidous fluid from one or more reservoirs 14 along a delivery path 16 to a chromatographic column 18. Typically, the liquidous fluid is metered through a valve 20. A transfer line degassing apparatus 22 may act to remove gas from the liquidous fluid and/or prevent re-gassing of the liquidous fluid from the environment. As described in greater detail herein below, degassing apparatus 22 includes one or more membranes for separating gas from liquid contained in the fluid. The fluid delivery flow path 16 directs fluid through a fluid inlet 24 of degassing apparatus 22, and thence along a degassing flow path through degassing apparatus 22 to a fluid outlet 26. Treated fluid, which may be a liquid, or reduced gas concentration fluid, is output to downstream equipment appropriate for the application, such as an injection valve, chromatographic column 18, or other chromatographic equipment.

Fluid degassing system 10 may include a vacuum pump 30 for evacuating a permeate side of a chamber within degassing apparatus 22. Vacuum pump 30 is fluidly connected to a port 32 in degassing apparatus 22 that opens to the permeate side of the chamber. A controller 34 may be communicatively coupled to one or both of vacuum pump 30 and fluid pump 12, as well as to a pressure sensor 36 in the permeate side of the chamber within degassing apparatus 22. Pressure sensor 36 is capable of sending a signal to controller 34 to adjustably operate one or more of vacuum pump 30 and fluid pump 12 to achieve a desired balance of fluid flow rate and permeate side environment in degassing apparatus 22.

In the embodiment of FIG. 1B, a plurality of distinct fluid delivery flow paths 16a-16c may be established from distinct fluid reservoirs 14a-14c. Certain applications involve multiple distinct fluids for analysis, and each fluid is desirably degassed prior to delivery to the chromatographic column 18 or other downstream component. In this case, a plurality of transfer line degassing apparatus 22a-22c may be employed for degassing fluid drawn from each distinct reservoir 14a-14c, and the resultant degassed fluid passed to a proportioning valve 20. To use a single vacuum pump 30, a vacuum manifold 31 may combine the distinct gas exhaust lines from each degassing apparatus 22. Thus, the vacuum manifold may be interposed between the vacuum pump 30 and the individual transfer line degassers 22.

Figure 2:
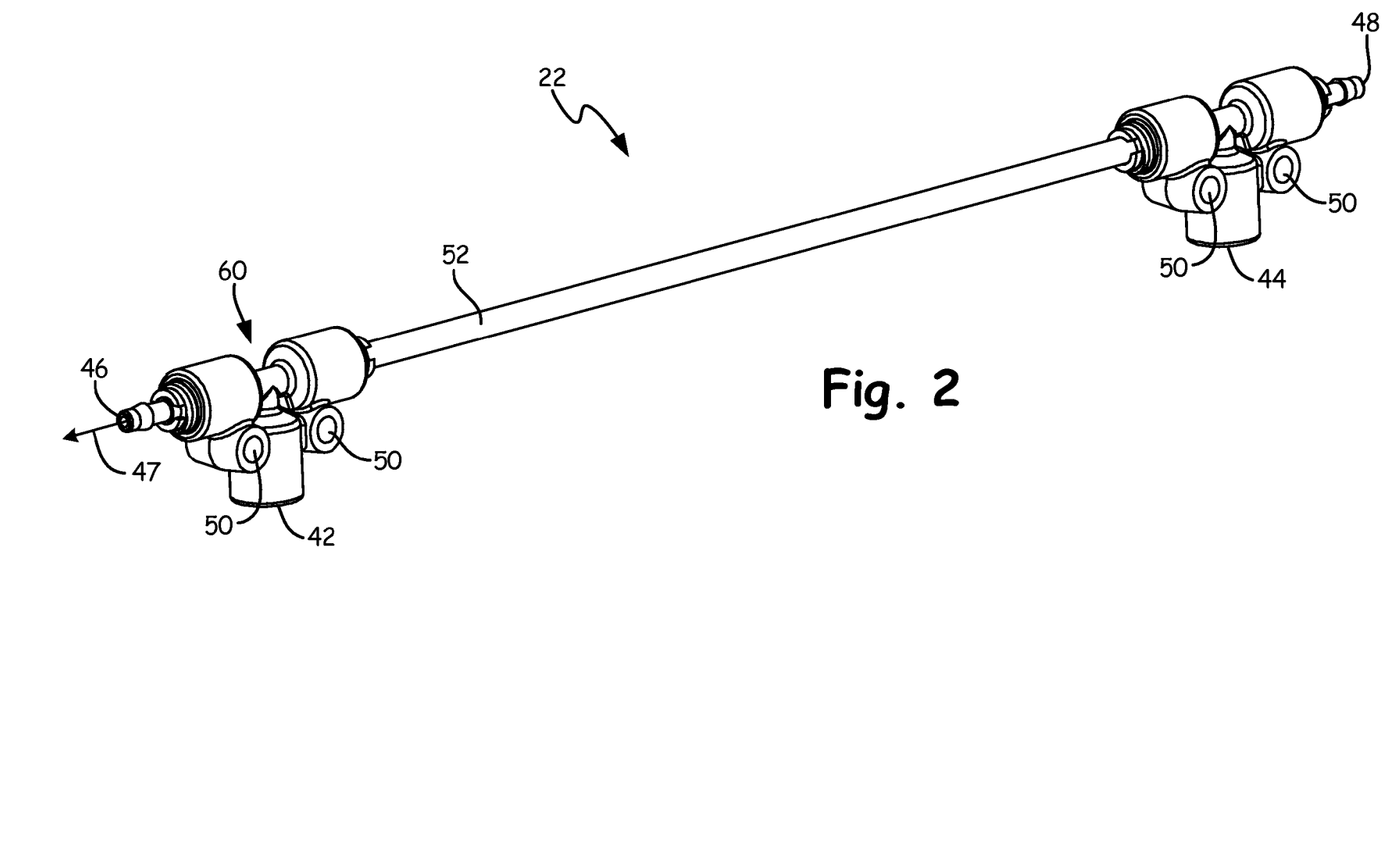
FIG. 2 is a perspective view of a degassing apparatus of the present invention.

An example embodiment of a degassing apparatus 22 of the present invention is illustrated in FIG. 2. Degassing apparatus 22 is preferably arranged as a flow-through, elongated transfer line degasser, with a liquidous fluid inlet 42 and a liquidous fluid outlet 44. A first port 46 may be fluidically connected to a pump, such as vacuum pump 30 for evacuating a permeate side of a chamber within degassing apparatus 22. First port 46 defines a portion of a gas flow path 47 along which gas is transported through degassing apparatus 22. When fluidically coupled to vacuum pump 30, gas is motivated out from degassing apparatus 22 through port 46. In some embodiments, a second port 48 forms a portion of the gas flow path 47, such as a gas inlet. Gas flowing along gas flow path 47 through second port 48 may include make-up gas, such as air, or a sweep gas, such as nitrogen, helium, or other gases for effectuating a degassing driving force across the membrane. Receptacles 50 may be useful in mounting degassing apparatus 22 within a system such as fluid degassing system 10.

Figure 3:
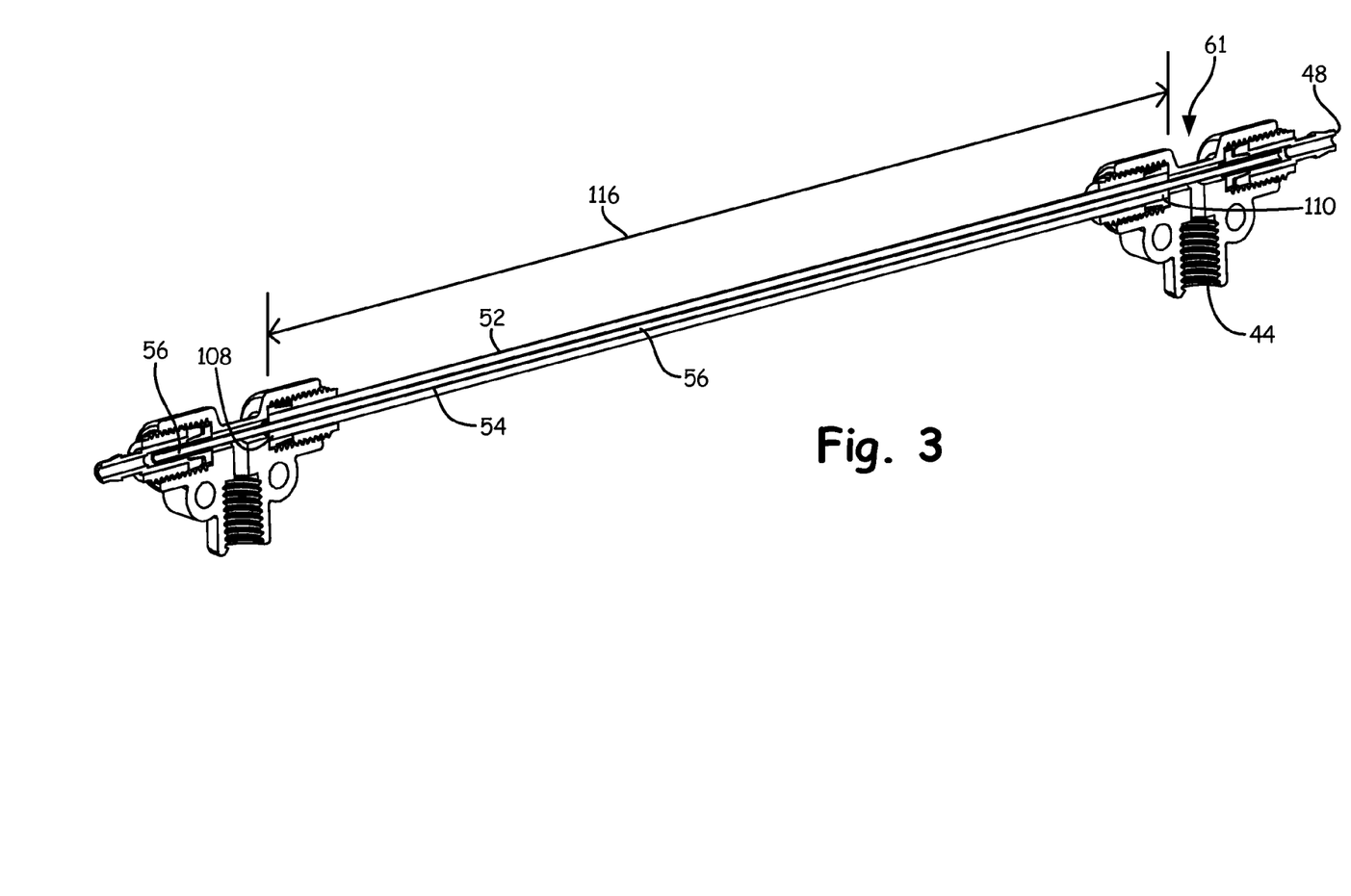
FIG. 3 is a cross-sectional perspective view of a degassing apparatus of the present invention.

A cross-sectional view of degassing apparatus 22 is illustrated in FIG. 3, wherein a tubular semi-permeable separation membrane 56 extends axially in a jacket chamber 54 defined by an outer jacket 52. A first coupler unit 60 preferably establishes the fluidic pathways and connections for the liquidous fluid to contact the retentate side of the membrane, and for the separated gas to be removed from the permeate side of the membrane. In some embodiments, first coupler unit 60 is a single body that may be molded or cast from an inert material suitable for contact with the liquidous fluid. As shown in the enlarged cross-sectional view of first coupler unit 60 in FIG. 4, a first fluid line receptacle 62 acts as fluid inlet 42 for degassing apparatus 62, wherein a fluid conduit may be threadably or otherwise received in receptacle 62, and fluid conveyed from the conduit into a liquidous fluid channel 64 along a fluid flow path 66. This fluid flow path 66 is also shown schematically in FIG. 1 as a portion of fluid delivery flow path 16.

Figure 4:
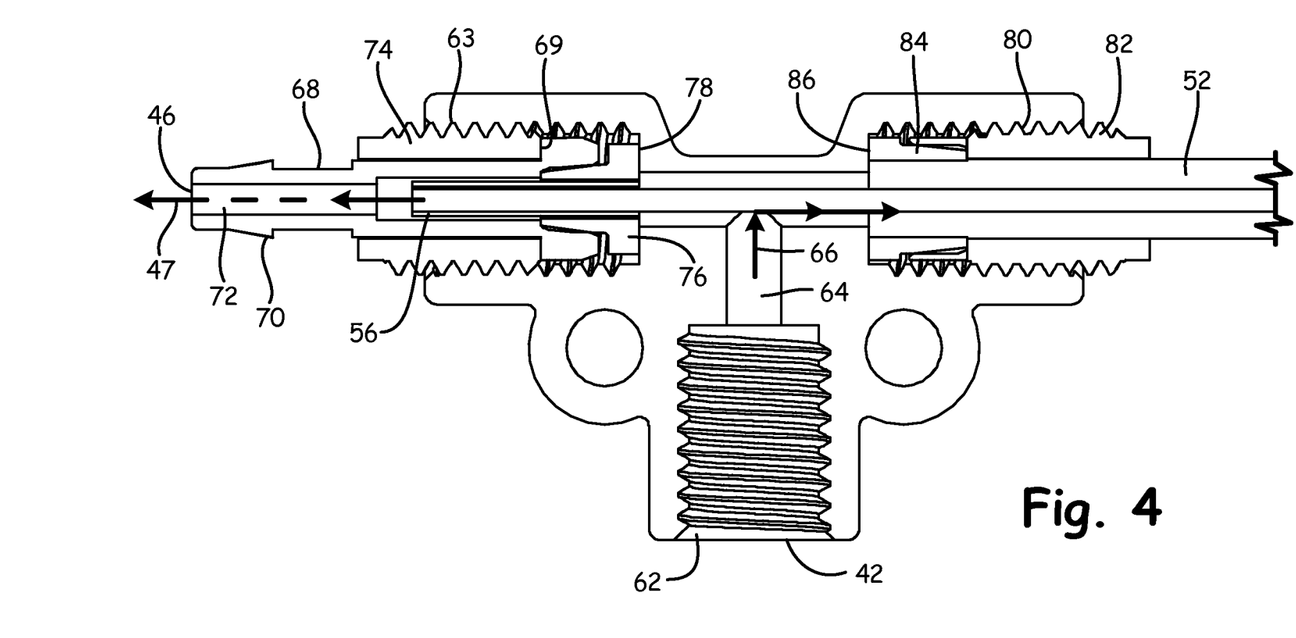
FIG. 4 is a cross-sectional side elevational view of a portion of the degassing apparatus of the present invention.

First port 46 may be an opening in a barbed fitting 68, wherein a barb end 70 may be retainably secured in a lumen of a hose or other conduit for conveying gas to, for example, vacuum pump 30. Barbed fitting 68 defines a channel 72, which forms a portion of the gas flow path 47. Barbed fitting 68 may be directly threadably received in first connection receptacle 63 of coupler unit 60, or, as illustrated in FIG. 4, may be secured in first connection receptacle 63 with a nut 74 bearing against a bearing flange 69 or barbed fitting 68. This engagement may also act to secure tubular membrane in first coupler unit 60, wherein a resilient ferrule 76 is pressed about membrane 56 and against abutment surface 78 of first coupler unit 60 under the force of nut 74 threadably received in first connection receptacle 63. Ferrule therefore acts both to secure membrane 56 in place, and also to seal closed channel 72 so that liquidous fluid passing along fluid flow path 66 is prevented from entering channel 72, and out through first port 46. Moreover, the sealing engagement between ferrule 76 and membrane 56 prevents gas passing along gas flow path 47 from entering fluid flow path 66.

Figure 5:
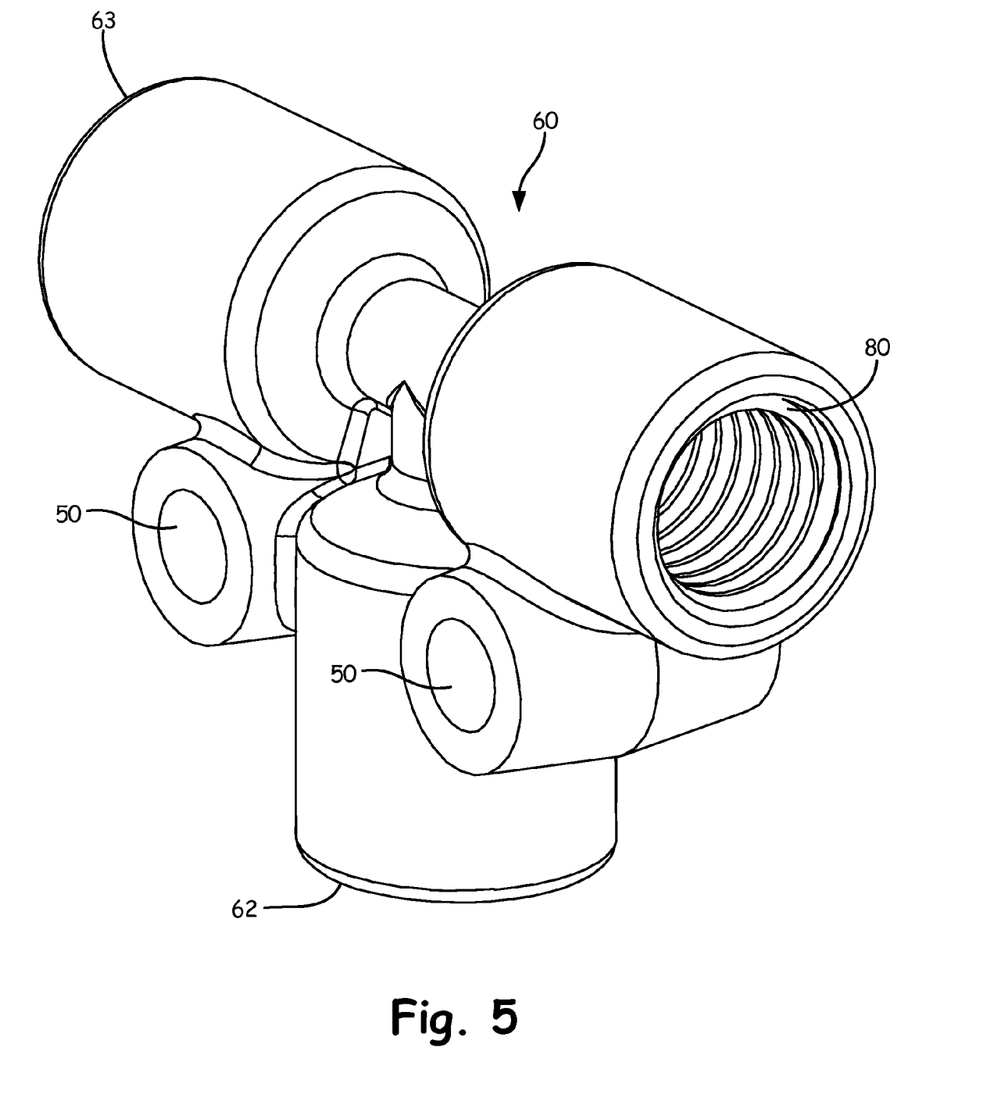
FIG. 5 is a perspective view of a portion of a degassing apparatus of the present invention.

Outer jacket 52 may be similarly secured at first coupler unit 60 in second connection receptacle 80, wherein nut 82 may be threadably engaged in second connection receptacle 80 to press a resilient ferrule 84 about outer jacket 52 and against abutment surface 86 of first coupler unit 60. The force of nut 82 against ferrule 84 is transmitted in part against outer jacket 52 to thereby secure outer jacket 52 in second connection receptacle 80. Outer jacket 52 may also be secured at second coupler unit 61 with similar components and methods. In some embodiments, second coupler unit 61 is substantially identical to first coupler unit 60. An isolation view of first coupler unit 60 is illustrated in FIG. 5.

Outer jacket 52 includes an inner surface 102 that defines a jacket chamber 104 along a central axis 106 of outer jacket 52. An inlet opening 108 of outer jacket 52 opens to jacket chamber 104, and an outlet opening 110 of outer jacket 52 opens to jacket chamber 104, wherein a continuous chamber 104 may be established between inlet opening 108 and outlet opening 110. Outer jacket 52 may preferably be an elongated structure that serves as a conduit for conveying liquidous fluid between stages in a liquid system, such as between reservoir 14 and fluid pump 12. Outer jacket 52 may therefore have an aspect ratio of at least 2:1, defined as the ratio of a length 112 of outer jacket 52 to a width or diameter 114 of outer jacket 52. Typically, outer jacket 52 may have an aspect ratio of at least 5:1, and in some embodiments, at least 10:1

Membrane 56 extends axially in jacket chamber 104 along a mutual axial length 116. For the purposes hereof, the term "mutual axial length" means the length along central axis 106 that membrane 56 is disposed in jacket chamber 104. In typical embodiments, membrane 56 may extend continuously along an entirety of length 112 of outer jacket 52, wherein mutual axial length 116 is substantially equal to length 112 of outer jacket 52. In other embodiments, however, length 112 of outer jacket 52 may be greater than mutual axial length 116.

Membrane 56 may preferably be tubular in shape, elongated so as to have an aspect ratio of at least 2:1. It is contemplated, however, that membrane 56 may assume other configurations for separating jacket chamber 104 into a retentate side and a permeate side, with the liquidous fluid contacting membrane 56 on the retentate side, for separation of gas from the fluid into the permeate side. One example such alternative configuration may be a substantially planar membrane dividing jacket chamber 104 into a retentate side and a permeate side.

In the illustrated embodiments, membrane 56 is tubular and extends axially in jacket chamber 104. Tubular membrane 56 includes a first open end 118, and defines a lumen 120 with a luminal axis 122 that is substantially parallel with central axis 104, and may be substantially coextensive with central axis 104. As such, membrane 56 may extend substantially coaxially and/or concentrically within outer jacket 52, and may be supported in its relative location in jacket chamber 104 with respect to outer jacket 52 by one or more spacer members 130 that are radially interposed between membrane 56 and outer jacket 52 in jacket chamber 104.

In the described example arrangement, lumen 120 may be evacuated through open end 118 of membrane 56 with a fluid connection between open end 118 of membrane 56 and vacuum pump 30. As described above, such fluid connection may be accomplished at first coupler unit 60. Once evacuated, lumen 120 may provide a driving force for degassing liquidous fluids contacting membrane 56 at a retentate side of the chamber, between membrane 56 and inner surface 102 of outer jacket 52. Henry's Law of partial pressure governs the separation driving force, with gas entrained within liquidous fluids passing through jacket chamber 104 on the retentate side of membrane 56 will tend to be drawn through the semi-permeable membrane 56, and into the relatively low partial pressure environment in lumen 120. The gas drawn from the liquidous fluid into lumen 120 through membrane 56 is consequently removed from lumen 120 through open end 118 under the motivation of, for example, vacuum pump 30. Such arrangement may be referred to as "outside-in" vacuum degassing.

The diffused gas may also or instead be evacuated from lumen 120 of membrane 56 with a sweep fluid. In a particular embodiment, a second open end 119 may be provided in membrane 56 so that environmental air or a different fluid may be drawn through lumen 120 to sweep diffused gas through first open end 118, and also to possibly prevent solvent condensation within lumen 120 as a result of solvent pervaporation through membrane 56. In other embodiments, end 119 may be closed, such that tubular membrane 56 is open only at first open end 118.

A sweep fluid may be in gaseous or liquidous form, and preferably flows adjacent to the liquidous fluid to be degassed, but separated by the wall of separation membrane 56. In some embodiments, such sweep fluid flows counter to the flow direction of the liquidous fluid being degassed, such that the efficiency of liquid degassing is enhanced. To effectively degas the liquidous fluid, the sweep fluid preferably has a relatively low partial pressure (gas) or concentration (liquid) with respect to the target gaseous species being operably removed from the liquidous fluid.

With respect to the illustrated embodiment, liquidous fluid to be degassed may be directed through liquidous fluid inlet 42 along fluid flow path 66, and into jacket chamber 54 for contact at a retentate side of membrane 56. A sweep fluid may be brought into apparatus 22 through second port 48 of second coupler unit 61, and thereafter into second open end 119 of membrane 56. The sweep fluid flow is oppositely directed through apparatus 22 within lumen 120 of membrane 56, and ultimately out of apparatus 22 through first open end 118 and port 46 of first coupler unit 60.

The target gas concentration that is to be operably degassed in a designated one of the first and second fluids should be higher in the designated removal fluid than in the receiving fluid in order for transfer of the target gas through the one or more semi-permeable membranes 56 to occur. For example, where target gas is to be removed from the liquidous fluid passing around tubular membrane 56 in jacket chamber 54, the second fluid passing through lumen 120 should have a target gas concentration lower than that of the first liquidous fluid. When such conditions are present, the sweep fluid removes at least a portion of the gas entrained within the first liquidous fluid.

It is also contemplated by the present invention that the apparatus described herein for degassing one or more liquidous fluids may also be utilized in preventing the regassing of such fluids. For example, a fluid that has previously been substantially degassed may be directed through degassing apparatus 22 such that, for mutual axial length 116, the liquidous fluid being passed through jacket chamber 104 does not absorb undesired gaseous components, or at least undesired concentrations thereof. Such an aspect is important where pre-degassed fluids must be transferred from a source to a destination without absorbing gaseous components therein. The apparatus of the present invention, therefore, enables such transportation of pre-degassed fluids without risk of regassing due to the fact that the reduced pressure environment at the permeate side of the chamber prevents gaseous components from entering into the liquidous fluid stream. In such a manner, the apparatus of the present invention may be termed a fluid treatment apparatus which may be utilized to degas fluids and/or prevent the regassing of such fluids in a transfer line device.

Outer jacket 52 is liquid impermeable to contain and convey liquidous fluids through jacket chamber 104. Outer jacket may be substantially liquid and gas impermeable, and may be less gas permeable than the total gas permeability of membrane 56, including the total gas permeability of a plurality of membranes 56 in jacket chamber 104. Example materials useful for outer jacket 52 include Tefzel® (a modified ETFE), PEEK, FEP, PFE, Tygon® (a polymeric material available from Saint Gobain Performance Plastics of Akron, Ohio), and the like. Outer tube 52 may preferably be inert to the liquidous fluid, so as to avoid undesired reactions and/or contaminations with the liquidous fluid. Moreover, outer tube 52 may preferably be flexible so as to allow manipulation of the transfer line apparatus with little effort, and without substantial risk of damage to outer tube 52. As such, some embodiments of the transfer line apparatus may be manipulated by the user into a wide variety of configurations to best conform to the desired application.

Membrane 56 may be in the form of one or more lengths of tubing to form a gas-permeable, liquid-impermeable barrier between the jacket chamber 104 (retentate side) and lumen 120. Membrane 56 is therefore preferably "semi-permeable", in that it is substantially impermeable to liquids while being permeable to gasses. In some preferred embodiments, membrane 56 is non-porous, and permits component transport therethrough by a solution diffusion mechanism, rather than a Knudsen diffusion mechanism through a mean free path. Membrane 56 may be fabricated from one or more materials, including in one or more layers, or in composite form. Example membrane materials useful in the manufacture of semi-permeable membrane 56 include silicone rubbers, polytetrafluoroethylene, amorphous fluoropolymers (such as Teflon® AF from E.I. du Pont de Nemours and Company of Wilmington, Del.), and other polymer and non-polymer materials. The separation membrane may be qualified for a specific application as having known permeation rates for certain gaseous species, as well as known selectivity values.

Figure 6:
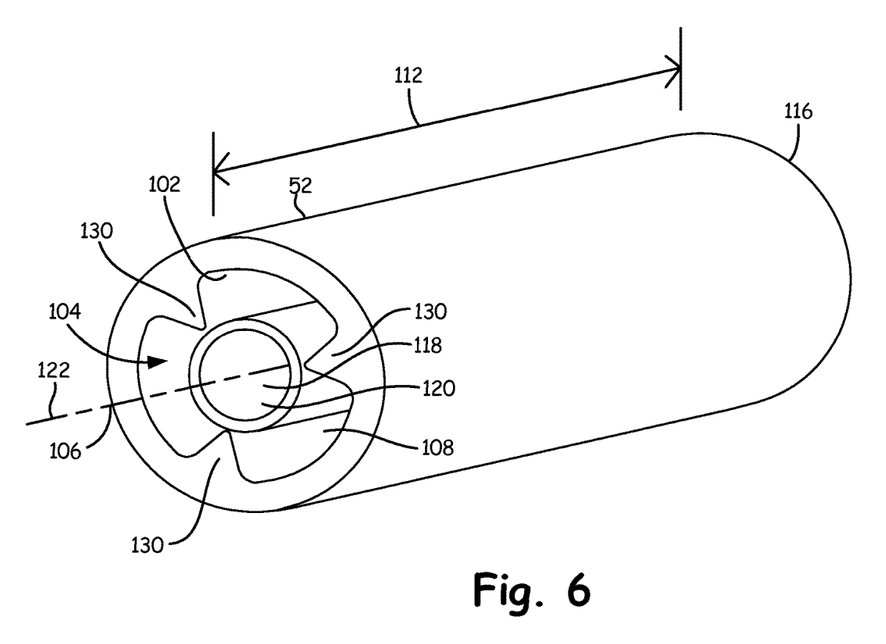
FIG. 6 is a perspective view of a portion of a degassing apparatus of the present invention.
Figure 7:
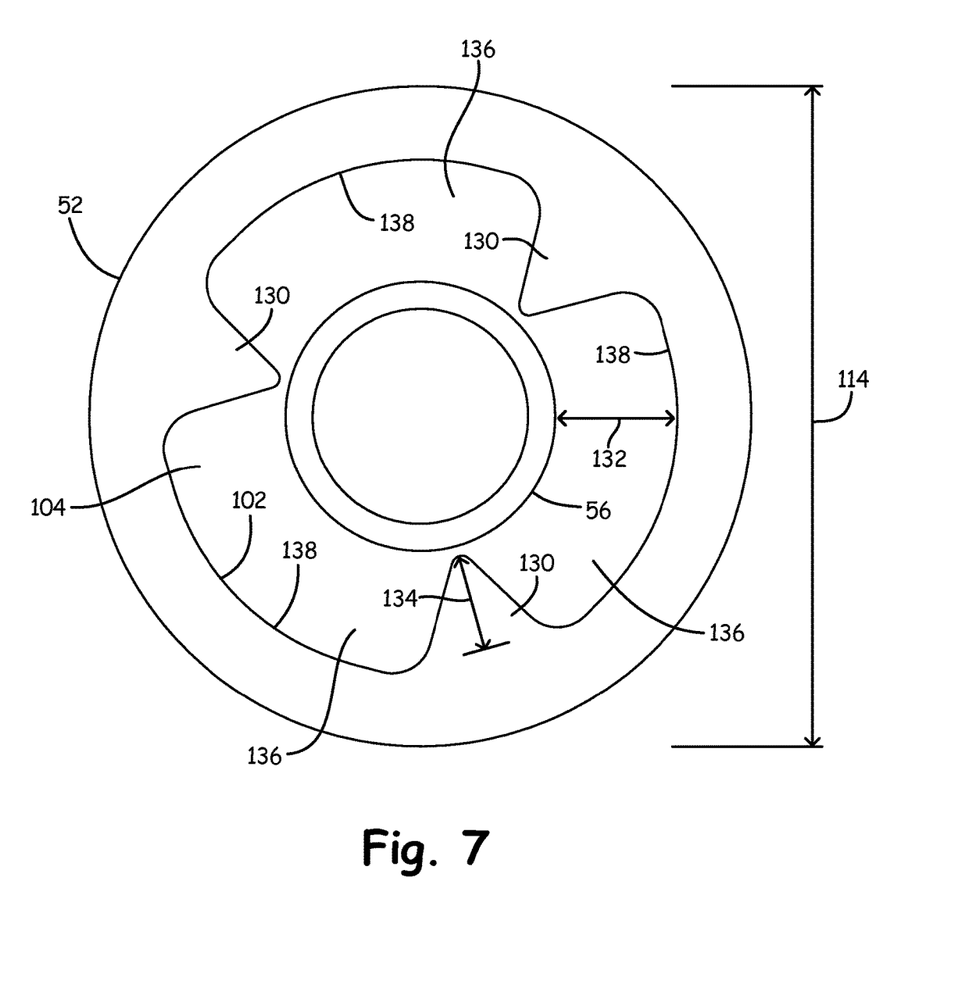
FIG. 7 is an end view of the portion of the degassing apparatus illustrated in FIG. 6.

Spacer members 130 may be radially interposed between membrane 56 and outer jacket 52 in jacket chamber 104 substantially along an entirety of mutual axial length 116 to maintain membrane 56 in a spaced relationship from inner surface 102 of outer jacket 52. The spacer members 130 define a radial gap 132 defined radially between membrane 56 and inner surface 102 of outer jacket 52. Spacer members 130 may be distinct bodies placed axially in jacket chamber 104, and circumaxially spaced apart about central axis 106 to maintain a relatively radially central position for membrane 56 in jacket chamber 104. In other embodiments, the one or more spacer members 130 may be integrally formed with one or both of outer jacket 52 and/or membrane 56. In the embodiment illustrated in FIGS. 6 and 7, a plurality of spacer members 130 are circumaxially spaced about central axis 106 and extend substantially parallel to central axis 106. Spacer members 130, in this embodiment, are an integrally co-extruded body with outer with outer jacket 52, and form a projection or "rib" extending generally radially inwardly from inner surface 102 of outer jacket 52 by a spacer dimension 134. It is contemplated that spacer dimension 134 may be substantially equal to, but slightly smaller than gap 132, wherein membrane 56 may be inserted into jacket chamber 104 after the production of outer jacket 52, without incurring damaging frictional forces or impact forces. Each of spacer members 130 may have an equivalent spacer dimension 134, or may instead have different respective spacer dimensions 134 to maintain a desired position of membrane 56 in jacket channel 104. In some embodiments, spacer members 130 may be configured and arranged to position membrane 56 coaxially within jacket chamber 104, with luminal axis 122 being substantially coaxial with central axis 106. In such an arrangement, fluid channels 136 may be formed about membrane 56 in jacket chamber 104 for the liquidous fluid to flow through jacket chamber 104 in contact with membrane 56. In some cases, each flow channel 136 may be substantially equivalent in shape and length, as well as uniform in shape and length, so as to provide a substantially equal flow restriction to a liquidous fluid passing therethrough. Gap 132 is defined between membrane 56 and a channel region 138 of inner surface 102 of outer jacket 52, wherein the channel region 138 of inner surface 102 is defined as the portions of inner surface 102 at a flow channel 136. Typically, such channel regions 138 may be defined circumaxially between adjacent spacer members 130.

Figure 8:
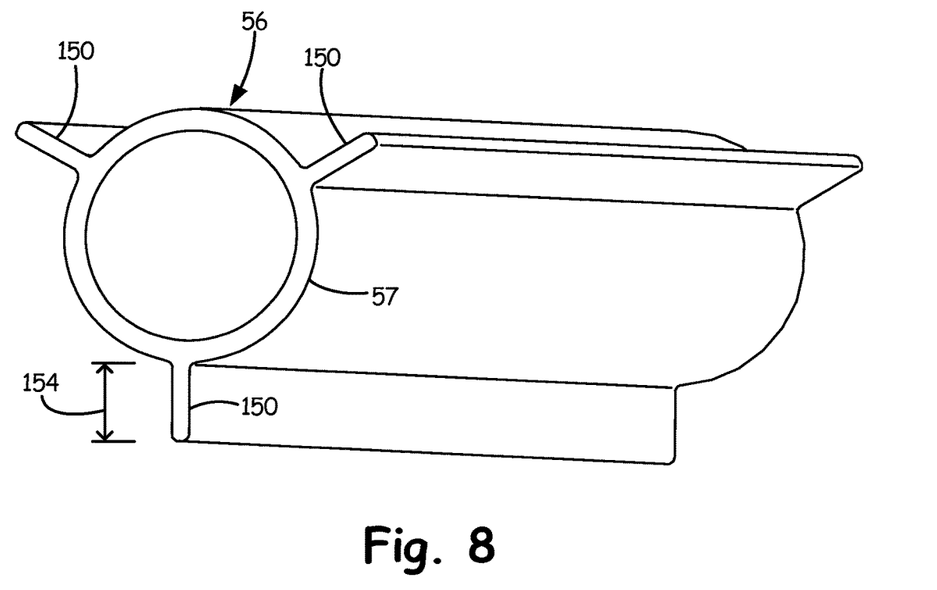
FIG. 8 is a perspective view of a portion of a degassing apparatus of the present invention.

An aspect of the present invention is the control of the dimensions of gap 132, and particularly the spacing dimensions between inner surface 102 of outer jacket 52 and separation membrane 56. Applicant has discovered that control of gap 132 and such separation spacing can dramatically improve degassing proficiency in a flow-through degassing apparatus 22. To assist in correctly positioning tubular separation membrane 56 in jacket chamber 104, one or more spacer members 130 may be positioned in jacket chamber 104 to support and/or maintain at least a predetermined spacing between inner surface 102 of outer jacket 52 and tubular separation membrane 56. In some embodiments, spacer members 130 are connected to outer jacket 52, and extend from inner surface 102 by a spacer dimension 134 that is substantially equivalent to the predetermined spacing. In other embodiments, such as that illustrated in FIG. 8, one or more spacer members 150 may be connected to tubular membrane 56, and extend from an outer surface 57 by a spacer dimension 154. In this embodiment, spacer members 150 may be an integrally co-extruded body with tubular membrane 56.

To enhance degassing efficiency, gas transport resistance should be reduced. In membrane vacuum degassing applications, transport resistance is primarily derived from the liquid phase and the membrane. To reduce the liquid phase transport resistance, gap 132 (the solvent depth) is reduced. However, a smaller gap 132 increases the flow resistance of the liquidous fluid through jacket chamber 104, and may also cause difficulties in manufacturability. Thus, a balance is preferably struck among the efforts of reducing the size of gap 132, while maintaining sufficient spacing between membrane 56 and inner surface 102 at channel regions 138 to limit the corresponding increase in pressure drop in the liquidous fluid flow through jacket chamber 104. Other configurational details may be employed to help reduce the liquid phase resistance, such as through local mixing in the liquid phase.

To calculate the pressure drop along jacket chamber 104 in fluid channels 136, we use the Darcy-Weisbach equation:

$$\Delta p = f_D \times \frac{L}{D} \times \frac{\rho V^2}{2}$$

Where $\Delta p$=pressure drop due to friction
L=length of jacket chamber 104 along mutual axial length 116
D=hydraulic diameter of jacket chamber 104 along mutual axial length 116
$\rho$=density of the fluid
V=mean velocity of the flow
$F_D$=Darcy friction factor Considering the annulus formation of the flow pattern ($D=D_1-D_2=2l$) ($D_1$ is the larger cylinder ID, D2 is the smaller cylinder OD, and l is the gap), the pressure drop is $$\Delta p = f_D \times \frac{L}{2l} \times \frac{\rho Q^2}{2\pi^2(D_2+l)^2 l^2} \approx \frac{f_D \rho Q^2 L}{4\pi^2 (D_2)^2 l^3}$$

The pressure drop is therefore inversely proportional to the third power of the gap 132. Applicant has determined that an appropriate dimension for gap 132 may be derived as the radial spacing between separation membrane 56 and inner surface 102 of outer jacket 52 at channel regions 138. Such spacing may be controlled by respective spacer member dimensions 134, 154 of spacer members 130, 150. Applicant has determined that spacer member dimensions 134, 154 may preferably be between 5-500 micrometers. While the spacer member dimensions 134, 154 may not be precisely equal to the actual spacing of membrane 56 from inner surface 102 of outer jacket 52 at channel regions 138, the presence and dimensions of spacer members 130, 150 provide for preferred radial dimensions of such spacing to achieve a balance between reduction and gas transport resistance, and an increase in pressure drop through jacket chamber 104.

It is to be understood that gap 132 may be defined as a channel or other flow region within which the liquidous fluid may flow in contact with a retentate side of separation membrane 156. Spacing members 130, 150 are examples of various structure that is effective in maintaining a desired spacing between tubular separation membrane 56 and its radially adjacent surfaces. Such radial spacing provides fluid flow channels radially outwardly of tubular separation membrane 56. The existence of such flow channels acts to reduce the liquid phase transport resistance of gas to the separation membrane, and the calibrated spacing dimensions maximize such effect within useful pressure drop parameters.

Spacer members 130, 150, in some embodiments, may form axially-aligned flow channels 136, which applicant has determined to aid in mass transport properties of degassing apparatus 22. That is, the defined flow channels between adjacent spacer members 130, 150 may promote fluid flow characteristics that benefit gas transport across separation membrane 56. Typically, apparatus 22 employs one or more spacer members that may be separate bodies positioned between separation membrane 56 and outer jacket 52, integral portions of outer jacket 52 extending from inner surface 102, or integral features extending outwardly from outer surface 57 of separation membrane 56. Embodiments may use any one or more of such spacer member types in a given application. While the illustrated spacer members 130, 150 extend substantially radially from a respective surface, it is contemplated that non-radially-arranged spacer members may also or instead be provided.

Figure 9A:
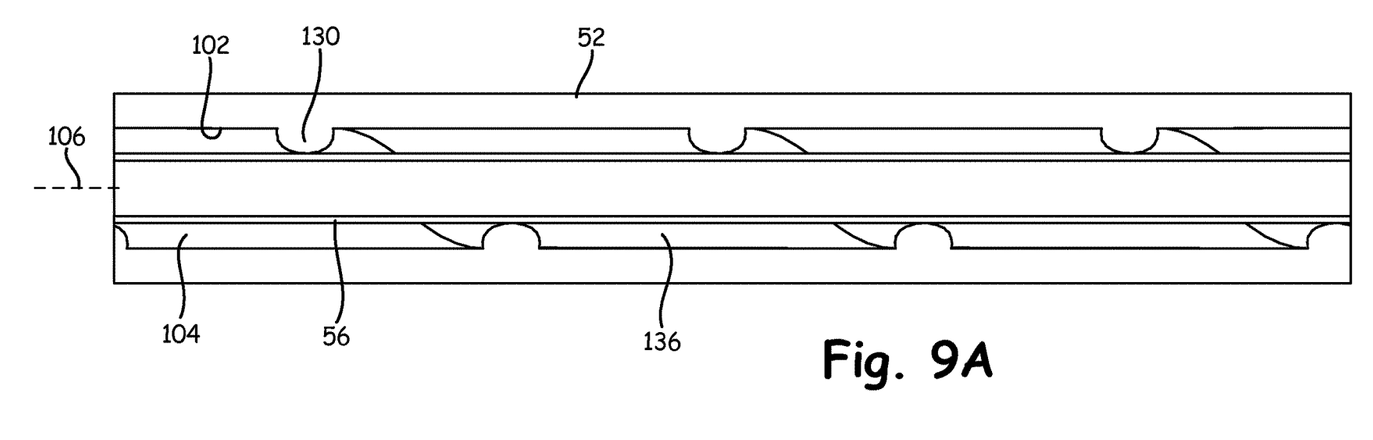
FIG. 9A is a cross-sectional side view of a portion of a degassing apparatus of the present invention.
Figure 9B:
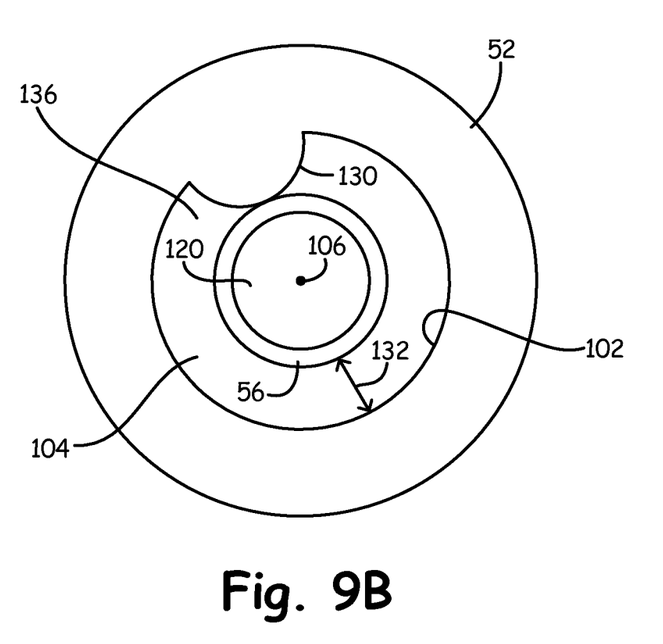
FIG. 9B is an end view of the portion of the degassing apparatus illustrated in FIG. 9A.

A particular alternative arrangement for spacer member 130 is illustrated in FIGS. 9A and 9B, wherein spacer member 130 may be spirally arranged about central axis 106. In this arrangement, flow channel 136 extends helically about separation membrane 56, guided by a spirally-wound spacer member 130. This arrangement may be particularly preferred for its lengthened contact flow path for the liquidous fluid through jacket chamber 104.

It is contemplated that one or more spacer members 130, 150 may be employed to desirably position separation membrane 56 in jacket chamber 104, and preferably substantially centrally along central axis 106. To minimize the volume occupied by spacer members 130, as well as the surface area covered on outer surface 57 of membrane 56, spacer elements 130 are preferably as thin as possible while nevertheless having adequate structural strength to maintain the desired spacing between membrane 56 and inner surface 102 of outer jacket 52. To accomplish such balance, spacer members 130 may be formed in a variety of configurations, with example cross-sectional shapes including rectangular, triangular, oval, semi-circular, and other useful shapes. It is further contemplated that a sufficient number of spacer members 130 may be employed to maintain separation membrane 156 in a desired spaced relationship from outer jacket 52. Example arrangements include a single, spirally-formed spacer member 130 that extends helically about central axis 106, two or more such spirally-formed spacer members 130, and three or more spacer members 130 circumaxially spaced about central axis 106, and extending axially and substantially parallel to central axis 106. It is contemplated that spacer members 130, 150 may extend continuously or discontinuously along mutual axial length 116.

The invention has been described herein in considerable detail in order to comply with the patent statutes, and to provide this skilled in the art with the information needed to apply the novel principles and to construct and use embodiments of the invention as required. However, it is to be understood that the invention can be carried out by different methods/devices, and that various modifications can be accomplished without departing from the scope of the invention itself.

What is claimed is:

1. An elongated fluid degassing apparatus, comprising:
an outer flexible, liquid-impermeable jacket having an inner surface defining a jacket chamber along a central axis of said jacket, wherein said jacket has an inlet opening to said jacket chamber and an outlet opening to said jacket chamber, and an aspect ratio of at least 2:1;
a tubular membrane extending axially in said jacket chamber along a mutual axial length, said tubular membrane having a first open end, the membrane defining a lumen with a luminal axis that is substantially parallel with said central axis, the membrane forming a gas-permeable, liquid-impermeable barrier between said jacket chamber and said lumen; and
one or more spacer members extending continuously in said jacket chamber substantially along an entirety of said mutual axial length to maintain said membrane in a spaced relationship from channel regions of said inner surface of said jacket, with a radial gap being defined radially between said membrane and said channel regions of said inner surface of said jacket, said radial gap being between 50-500 micrometers.

2. An elongated fluid degassing apparatus as in claim 1, including a first coupler unit fluidly connecting a fluid inlet to the radial gap through the inlet opening of said jacket, and fluidly connecting the lumen to a gas flow path through the first open end of the tubular membrane.

3. An elongated fluid degassing apparatus as in claim 2, including a second coupler unit fluidly connecting a fluid outlet to the radial gap through the outlet opening of said jacket.

4. An elongated fluid degassing apparatus as in claim 1 wherein said one or more spacer members are spirally arranged about the central axis.

5. An elongated fluid degassing apparatus as in claim 1, including a plurality of spacer members circumaxially spaced about the central axis and extending substantially parallel to the central axis.

6. An elongated fluid degassing apparatus as in claim 1 wherein said one or more spacer members are an integrally co-extruded body with said outer jacket.

7. An elongated fluid degassing apparatus as in claim 1 wherein said one or more spacer members are an integrally co-extruded body with said tubular membrane.

8. An elongated fluid degassing apparatus as in claim 1, including a plurality of tubular membranes extending axially in said jacket chamber along said mutual axial length.

9. An elongated fluid degassing apparatus as in claim 1, wherein said tubular membrane is non-porous.

10. An elongated fluid degassing apparatus as in claim 1, wherein said outer jacket is tubular with a substantially circular cross-section.

11. An elongated fluid degassing apparatus as in claim 1 wherein said radial gap is substantially uniform throughout said mutual axial length.

12. A method for degassing a liquidous fluid, said method comprising:
(a) providing the elongated fluid degassing apparatus of claim 3;
(b) evacuating said lumen through the first open end of said tubular membrane along the gas flow path;
(c) motivating the liquidous fluid through said fluid inlet and into contact with said membrane in said jacket chamber; and
(d) delivering the liquidous fluid from said jacket chamber through said fluid outlet.

13. A method for degassing a liquidous fluid, said method comprising;
(a) providing the elongated fluid degassing apparatus of claim 3;
(b) passing a sweep gas through said lumen along the gas flow path;
(c) motivating the liquidous fluid through said fluid inlet and into contact with said membrane in said jacket chamber; and
(d) delivering the liquidous fluid from said jacket chamber through said fluid outlet.

14. A degassing system for degassing a liquidous fluid, said degassing system comprising:
a liquidous fluid source;
the elongated fluid a degassing apparatus of claim 1;
a transfer channel fluidically connecting said liquidous fluid source to said inlet opening of said jacket;
a pump for motivating the liquidous fluid from said liquidous fluid source through said jacket chamber of said outer jacket; and
a vacuum source for evacuating said lumen through said first open end of said tubular membrane.

* * * * *